United States Patent [19]

Tremain et al.

[11] Patent Number: 5,652,039
[45] Date of Patent: Jul. 29, 1997

[54] SANDWICH PANEL FOR ANGULAR FORMING

[76] Inventors: Stephen R. Tremain, 7120 Collingwood Street, Drummoyne, NSW 2047; Robert S. Fuller, 21 Careen Road, Westleigh, NSW 120, both of Australia

[21] Appl. No.: 424,261

[22] PCT Filed: Oct. 25, 1993

[86] PCT No.: PCT/AU93/00549

§ 371 Date: Jul. 17, 1995

§ 102(e) Date: Jul. 17, 1995

[87] PCT Pub. No.: WO94/10406

PCT Pub. Date: May 11, 1994

[30] Foreign Application Priority Data

Oct. 23, 1992 [AU] Australia ............... PL 5508

[51] Int. Cl.$^6$ ............................................. B32B 9/00
[52] U.S. Cl. .................. 428/121; 428/124; 428/126; 428/128; 428/194; 428/215; 428/313.5; 428/314.2; 428/314.8; 52/631; 52/783.1
[58] Field of Search ................... 428/121, 124, 428/126, 128, 215, 401, 523, 57, 184, 313.5, 314.2, 314.8, 313.4; 52/622, 615, 582, 309, 631

[56] References Cited

U.S. PATENT DOCUMENTS

| | | | |
|---|---|---|---|
| 3,757,559 | 9/1973 | Welsh | 72/379 |
| 3,890,108 | 6/1975 | Welsh | 29/191.4 |
| 3,909,995 | 10/1975 | Bainter et al. | 52/79 |
| 3,969,868 | 7/1976 | Bainter et al. | 52/622 |
| 4,078,959 | 3/1978 | Palfey et al. | 156/214 |
| 4,671,985 | 6/1987 | Rodrigues et al. | 428/215 |
| 5,212,003 | 5/1993 | Homer | 428/57 |

FOREIGN PATENT DOCUMENTS

| | | |
|---|---|---|
| 3300993 | 2/1992 | Australia . |
| 2409855 | 6/1979 | France . |
| 3410197 | 9/1985 | Germany . |
| 1138637 | 1/1969 | United Kingdom . |
| 8400395 | 2/1984 | WIPO . |

*Primary Examiner*—Patrick Ryan
*Assistant Examiner*—Abraham Bahta
*Attorney, Agent, or Firm*—David H. Judson

[57] ABSTRACT

A foldable composite panel (1) comprising an inner layer (2) formed from a first material having a relatively high plasticity at least in compression, bonded to at least one adjacent outer layer (3) formed from a second material having a relatively low plasticity. The composite panel (1) can be permanently folded without failure at ambient temperature through an angle substantially greater than that through which the outer layer (3) alone could be folded without failure under comparable conditions.

37 Claims, 3 Drawing Sheets

SANDWICH PANEL FOR ANGULAR FORMING

FIELD OF THE INVENTION

The present relates to composite panels and more particularly to sandwich panels.

BACKGROUND OF THE INVENTION

The invention has been developed primarily for use in relation to display stands, display shelving and cabinets, shop fittings, interior architecture and design, interior facades, partitioning systems, and the like. It will be appreciated, however, that the invention is not limited to these particular fields of use.

Sandwich panels are well known and have found widespread use as structural materials in aeronautical and numerous other applications. The panels generally comprise a relatively thick core formed from a low density material such as foam, sandwiched between relatively thin but stronger outer skins. As is well known to those skilled in the art, such constructions have been found to produce excellent stiffness to weight characteristics.

Because of these properties, sandwich panels are generally designed for structural applications and as such, are normally intended to be as light as possible, and as stiff as possible to resist bending and buckling. In bending, most known sandwich panels tend to deform entirely elastically, or to exhibit only a relatively small amount of plastic deformation or yield before the ultimate strength of the composite material is reached, at which point either the core or one or both of the skins rupture and fail catastrophically. Thus, the panels tend to break rather than bend, when loaded beyond their limits of strength.

For this reason, most known sandwich panels have not been able to be permanently bent or cold formed into desired shapes and consequently, the manufacture of non-planar structures has required discrete panel sections to be butt-jointed, glued, or otherwise mechanically fastened to form the desired configuration. These processes are inefficient, labor intensive, time consuming and expensive. Even more importantly, however, the resultant loss of structural integrity at the joints makes largely redundant the potential strength characteristics which the sandwich panel might otherwise have been able to provide.

Some metal skinned panels have not been subject to these problems to the same extent. However, these suffer from other disadvantages in terms of excessive cost and weight. They are also subject to a tendency for the metal skins to yield under minimal surface pressure to produce visually and structurally undesirable surface distortion.

It is therefore an object of the present invention to provide a composite panel construction which overcomes or ameliorates at least some of these disadvantages of the prior art.

DISCLOSURE OF THE INVENTION

Accordingly, the invention consists in a foldable composite panel comprising an inner layer formed from a first material having a relatively high plasticity at least in compression, bonded to at least one adjacent outer layer formed from a second material having a relatively low plasticity, such that the composite panel can be permanently folded without failure at ambient temperature through an angle substantially greater than that through which the outer layer alone could be folded without failure under comparable conditions.

Without limiting the invention to any theoretical analysis, it is believed that the unexpected ability of the panel to be folded arises because on cold bending, the inner layer increases the natural bending radius and hence permits a greater angle of plastic deflection in the outer layer than would occur without the inner layer, whilst the outer layer prevents or at least delays the onset of tensile failure in the inner layer.

Preferably, the composite panel can also be permanently folded without failure through an angle substantially greater than that through which a panel of comparable thickness but composed entirely of the second material could be folded without failure under the same conditions.

Preferably, the respective plasticities of the first material and the second material permit permanent cold bending of the panel through an angle of at least 90° without failure.

Preferably also, the first material forming the inner layer comprises a relatively thick and relatively low density polyvinylchloride (PVC) sealed cell foam, whilst the second material forming the outer layer comprises a relatively thin and relatively more dense PVC plastic skin. In this way, the foam and the skin possess inherently similar chemical characteristics and can be bonded together with a PVC compatible semi-elastomeric adhesive. It will be appreciated, however, that any other suitable skin materials such as ABS, polycarbonates, polyethylenes, styrenes, urethanes, acrylics, epoxies, and polyesters may also be used. In the preferred embodiment, the PVC foam has a density of between 15 and 250 kg/m$^3$ and ideally around 70 kg/m$^3$, whilst the PVC skin has a density of between 400 and 1400 kg/m$^3$ and ideally between 700 and 1400 kg/m$^3$. The inner foam layer is preferably between 4 and 30 mm thick and ideally around 10 mm thick, whilst the skin is preferably between 0.5 and 3.0 mm thick, and ideally approximately 1.0 mm thick.

In the preferred embodiment, the panel comprises an inner core layer formed from the first material of relatively high plasticity sandwiched between surrounding skins formed from the second material of relatively low plasticity. The preferred thickness of the composite panel is between 5 and 50 mm, and ideally around 12 mm.

Preferably, the first material forming the core has a relatively high plasticity in compression and a relatively low plasticity in tension, whilst the second material forming the outer skins has a relatively low plasticity and is predominantly elastic in both tension and compression.

The panel can preferably be folded at room temperature through an angle of at least 90° using standard metal fabrication equipment and techniques such that the outside skin naturally forms a smooth rounded edge without failure, whilst the excess material of the inside skin buckles progressively and linearly into the core material to form a neat fold line defining the inside edge of the bend. The inward buckling of the inside skin is preferably accommodated by the core material yielding plasticly in compression.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
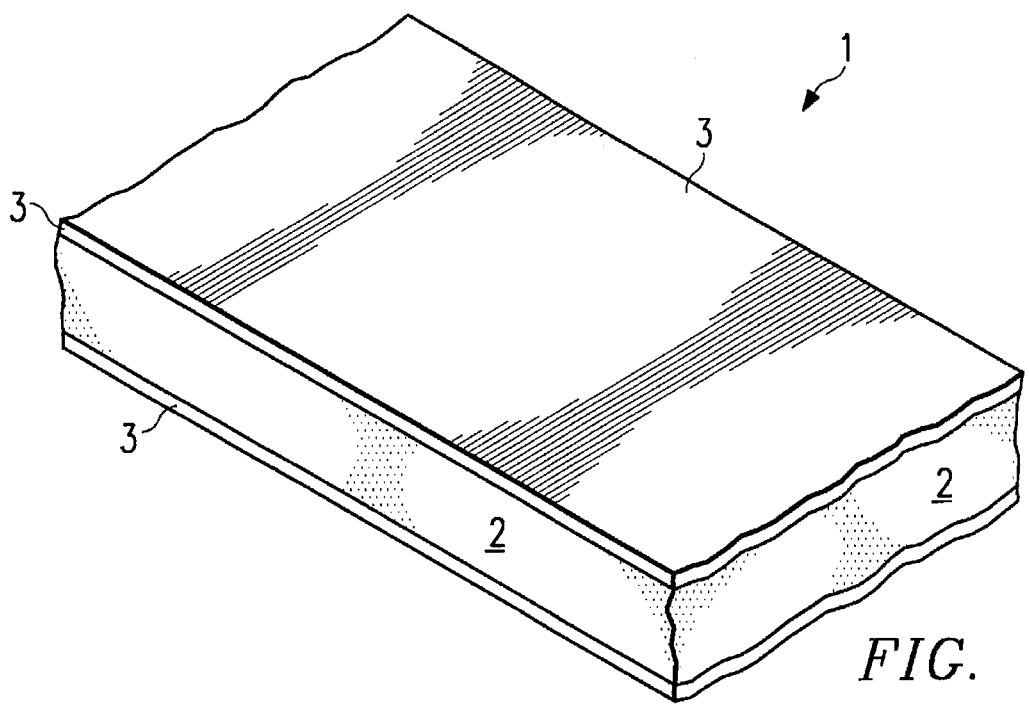
FIG. 1 shows a composite sandwich panel according to the invention.

Referring firstly to FIG. 1, the invention provides a composite sandwich panel 1 comprising an inner core layer 2 sandwiched between adjacent outer skins 3. The core layer is formed from a sealed cell polyvinylchloride (PVC) foam having a density of between 15 and 250 kg/m$^3$, more preferably between 50 and 100 kg/m$^3$, and ideally around 70 kg/m$^3$. The outer skins are preferably formed from a slightly foamed PVC plastic having a density of between 400 and 1400 kg/m$^3$, more preferably between 700 and 1400 kg/m$^3$, and ideally around 800 kg/m$^3$. Thus, the outer skins are significantly more dense than the core.

The core is preferably between 4 and 30 mm thick, more preferably between 8 and 15 mm thick and ideally around 10 mm thick. Each skin is preferably between 0.5 and 3.0 mm thick and ideally around 1.0 mm thick.

The composite panel is preferably between 5 and 50 mm thick, more preferably between 10 and 15 mm thick, and ideally around 12 mm thick. It has an overall density of between 100 and 400 kg/m, preferably around 200 to 350 kg/m$^3$, and a shear strength of around 6.6 N/mm. The skins are bonded to the core by means of any suitable PVC compatible structural grade elastomeric adhesive, such as neoprene contact glues, urethanes, acrylics, expoxies, polyesters and PVAs.

Table A below shows the physical properties of a particularly preferred PVC foam core material over a range of densities, with the "H" designation referring to the nominal density figure.

TABLE B

| ASTM DESIGNATION | PROPERTY | TYPICAL VALUE(S)* |
| --- | --- | --- |
| D792 | Density | 700 to 1400 kg/m$^3$ |
| D638 | Tensile Strength | 15–60 MPa |
| D638 | Tensile Modulus | 1000–3000 MPa |
| D256 | Izod Impact Strength | 0.53 to 23 ft lb/in$^2$ |
| D256 | Charpy Impact Strength (Un-notched) | 8.1 ft lb/in |
| D648 | Heat Deflection Temp 264 psi | 66 to 80° C. |
| E84 | Flame Spread Index | 20 |
| UL-94 | Vertical Burn Test | 5-VA |
| UL-1975 | Foam Fire Test | Passed-Classified |
| D696 | Coefficient of Linear Expansion | 4.0 × 10$^{-5}$ 1/F |
| D570 | Water Absorption | 0.3% |
| D2842 | Water Absorption | 0.9% |
| C177 | Thermal Conductivity | 0.084 W/mK |
| D149 | Dielectric Strength | 112 kV/cm |

\* Where data is available a range is specified. Otherwise, an indicative figure is provided.

Figure 2:
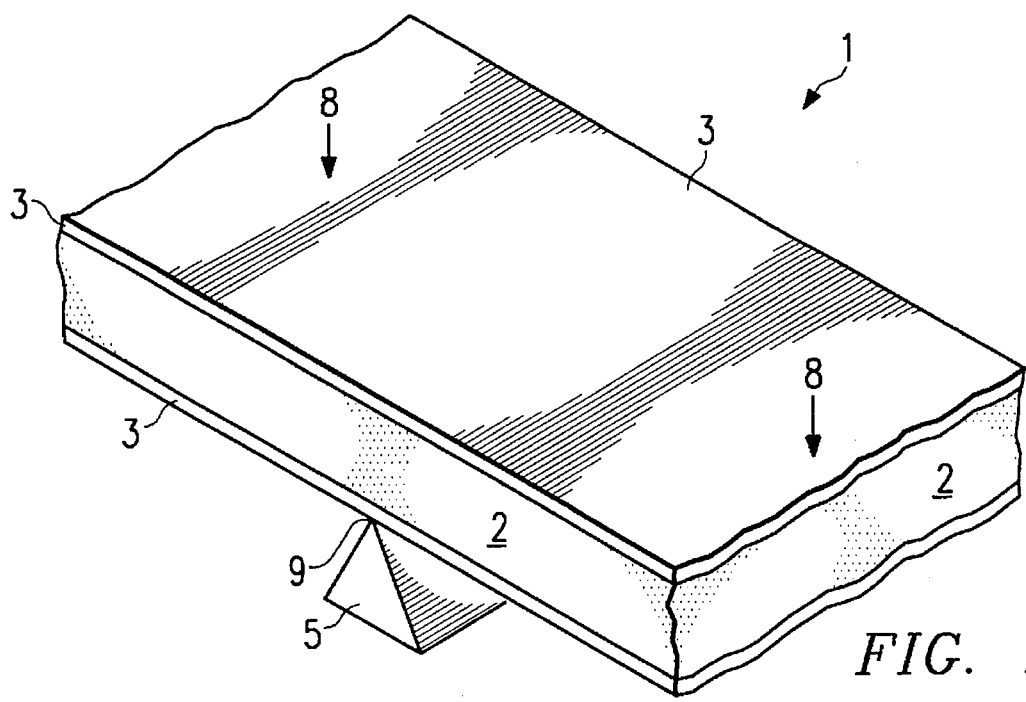
FIG. 2 shows diagrammatically the panel of FIG. 1 in the process of bending at room temperature.
Figure 3:
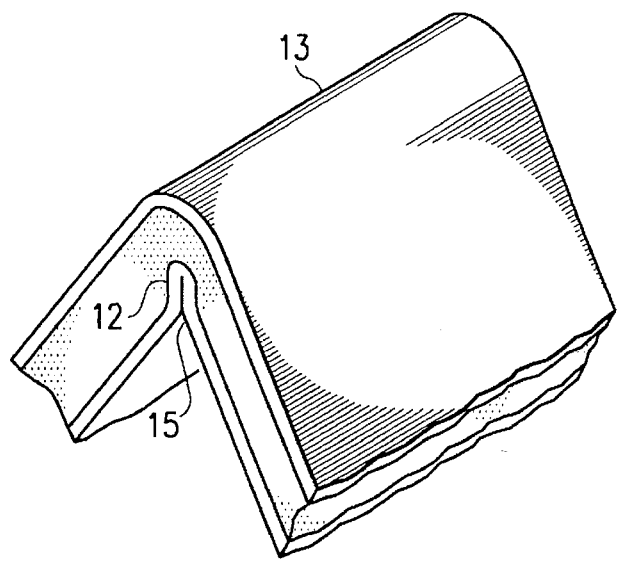
FIG. 3 shows the panels of FIGS. 1 and 2 folded through an angle of 90°.

FIG. 2 is a diagrammatic representation of a first bending technique which in essence simply involves the use of a forming tool 5 adapted to notch the adjacent skin and to resist the applied bending loads 8. The forming tool in conjunction with the applied bending loads induces an entirely unexpected but yet controlled and repeatable folding mechanism which surprisingly enables the panel to fold neatly through any desired angle up to at least 90° and yet retain its structural integrity, as shown in FIG. 3.

Turning to consider the bending mechanism in more detail, but without implication that the invention is dependent upon any theoretical analysis, the PVC skins unsupported have a relatively low plasticity. Without the foam core as support, the skins tend to form tight radius bends once the yield point is reached, and because of the resultant stress and strain concentrations, will not deform through 90° without total failure.

Similarly, if bending loads are applied to the core unsupported, it too will fail if bent through angles of less

TABLE A

| Quality | | H30 | 645 | H60 | H80 | H100 | H130 | H160 | H200 | H250 |
| --- | --- | --- | --- | --- | --- | --- | --- | --- | --- | --- |
| Density | kg/m$^3$ | 36 | 48 | 60 | 80 | 100 | 130 | 160 | 200 | 250 |
| ASTM D 1622 | lb./ft$^3$ | 2.3 | 3.0 | 4.0 | 5.0 | 6.0 | 8.0 | 10.0 | 12.4 | 15.6 |
| Compressive strength* | Mps + 20° C. | 0.3 | 0.6 | 0.8 | 1.2 | 1.7 | 2.5 | 3.4 | 4.4 | 5.8 |
| ASTM D 1621 | psi + 68° F. | 45 | 80 | 115 | 175 | 245 | 360 | 500 | 640 | 840 |
| Compressive modulus* | Mps + 20° C. | 20 | 40 | 60 | 85 | 125 | 175 | 230 | 310 | 400 |
| ASTM D 1621 procedure B | Psi + 68° F. | 200 | 5800 | 8700 | 12325 | 18125 | 25375 | 33350 | 44950 | 58000 |
| Tensile strength* | Mps + 20° C. | 0.9 | 1.3 | 1.6 | 2.2 | 3.1 | 4.2 | 5.1 | 6.4 | 8.8 |
| ASTM D 1623 | psi + 68° F. | 130 | 190 | 230 | 320 | 450 | 610 | 740 | 930 | 1275 |
| Tensile modulus* | Mps + 20° C. | 28 | 42 | 56 | 80 | 105 | 140 | 170 | 230 | 300 |
| ASTM D 1623 | psi + 68° F. | 4060 | 6090 | 8120 | 11600 | 15225 | 20300 | 24650 | 33350 | 43500 |
| Tensile strength** | Mps + 20° C. | 0.8 | 1.2 | 1.5 | 2.0 | 2.4 | 3.0 | 3.9 | 4.8 | 6.4 |
| ISO 1926 | psi + 68° F. | 115 | 170 | 215 | 290 | 350 | 430 | 560 | 690 | 920 |
| Shear strength** | Mps + 20° C. | 0.35 | 0.5 | 0.7 | 1.0 | 1.4 | 2.0 | 2.6 | 3.3 | 4.5 |
| ASTM C 273 | psi + 68° F. | 50 | 70 | 100 | 145 | 200 | 290 | 380 | 480 | 650 |
| Shear modulus** | Mps + 20° C. | 13 | 18 | 22 | 31 | 40 | 52 | 66 | 85 | 108 |
| ASTM C 273 | psi + 68° F. | 1885 | 2610 | 3190 | 4495 | 5800 | 7540 | 9570 | 12325 | 15660 |

\* = perpendicular to the plane.
\*\* = parallel to the plane.

Additional physical properties of a particularly preferred PVC skin material are set out below in Table B.

than 90°. The core material thus appears to behave in an elastic rather than a plastic manner, and simply breaks once the elastic limit is reached. Closer investigation, however, reveals that the foam core is relatively brittle in tension and yet is highly plastic in compression. This is believed to be because when the core is progressively loaded in tension, the individual cells are elongated until finally the cell walls fail. A crack forms from the first broken cells and subsequent failures occur progressively in the surrounding cells. The strength of the material is of course related to the cross-sectional area and as the crack propagates, the uncracked cross-sectional area decreases and the residual strength is correspondingly reduced. So, as an increasing number of cells fail, the remaining cells attract more stress and they too fail. As a consequence, total failure of the sample happens very rapidly.

When the foam core is loaded in compression, however, the individual cells are being crushed. Initially, they resist this crushing force by changing shape, and a resisting gas pressure builds up in the sealed cells. As the compressive force is increased the cells eventually rupture and collapse. However, immediate and catastrophic failure does not occur in this case because once a series of cells fail, the surrounding cells tend to expand into the area previously occupied by the crushed cells, and the compressive forces are partially supported by these neighboring cells. The crushed remains of the damaged cell walls also compact to a state where they too can contribute to resisting the compressive loads. Consequently, the foam core under compression loading is found to act in a particularly plastic manner, with considerable permanent deformation possible before ultimate failure occurs.

Thus, it will be appreciated that in bending, brittle type failures will occur relatively quickly on the tension side of the unsupported core. The ductile, plastic behavior possible on the compressive side of the core is not allowed to develop to any significant extent before the tension failure mechanism dominates to produce an overall brittle type failure. In other words, the tensile characteristics of the unsupported core control its overall bending characteristics.

With the core sandwiched between the outer skins, however, the synergistic interaction between the complementary characteristics described above, results in quite different and unexpected failure mechanisms and deformation characteristics.

Under the loads applied in FIG. 2, the edge 9 of the forming tool in contact with the adjacent skin induces a relatively high localized compressive stress concentration along the contact line to initiate buckling of the skin and localized crushing of the underlying core along that line. Thus, the initiation of the cold forming process is governed by the combined action of plastic crushing of the core and compression wrinkling of the skin, whereby the skin begins to buckle into the foam core. This initially forms a defined hinge or fold along the contact line of the forming tool. Further bending causes this hinge or fold to begin to propagate into the core, which yields in plastic compression in response, but does not fail.

Once the fold is initiated in this way, it will propagate in an entirely progressive and predictable manner provided sufficient bending moment is applied, with or without the assistance of the forming tool. As best seen in FIG. 3, as the angle of deflection gradually increases, the "V" 12 formed by the inner skin advances inwardly into the foam core and this propagation is accommodated by simple plastic compression of the core. In this way, the outside skin naturally forms a smooth rounded edge 13, whilst the excess material of the inside skin buckles uniformly into the core material to form a neat line 15 defining the inside edge of the fold. If necessary, a suitable adhesive can be deposited in the fold line between the arms of the "in" 12 to secure the folded panel in the desired configuration. Appropriate support brackets and struts can also be used if necessary.

During this process, peripheral wrinkling and buckling of the skin in the vicinity of the fold does not occur because of the support provided by the underlying foam core. Likewise, the foam core does not fail in tension because the critical tensile stresses are supported by the outer skin. Consequently, the core is mostly or entirely loaded in compression so that failure is plastic and ductile rather than elastic and brittle. The outer skin would also fail if unsupported. However, in the sandwich panel, during folding the natural bending radius is substantially increased for a given angle of deflection because of the support provided by the partially compressed underlying foam core in the vicinity of the fold. By substantially increasing the bending radius, the partially collapsed inner core prevents localized stress concentrations and hence prevents the tensile failure in the outer skin which would otherwise occur.

By this mechanism, the panel can be neatly folded through angles of at least 90° to produce non-planar panel structures of almost any desired shape or configuration.

Figure 4:
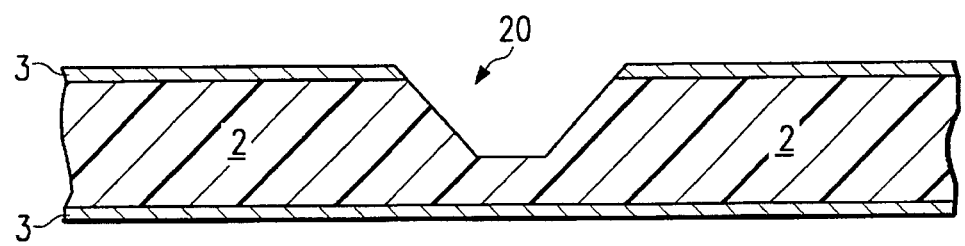
FIG. 4 is a cross-sectional side elevation showing a V groove machined into a panel as part of an alternative bending technique.
Figure 5:
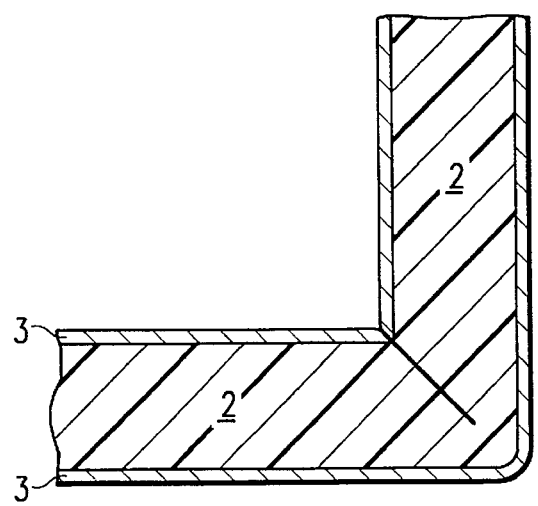
FIG. 5 shows the panel of FIG. 4 folded and glued along the in groove.

Another folding mechanism involves the use of a router or other suitable tool to machine a V groove 20 in the panel, as best seen in FIG. 4. With the in groove pre-formed, the panel can simply be folded and glued to form a structural corner of the appropriate angle, as shown in FIG. 5. Where particularly long folds are involved, this technique can be quicker and more convenient to perform on site. This technique also has the advantage that the panels can be prefabricated with the appropriate in grooves to facilitate—transportation in the flattened configuration and accurate assembly at remote locations.

Figure 6:
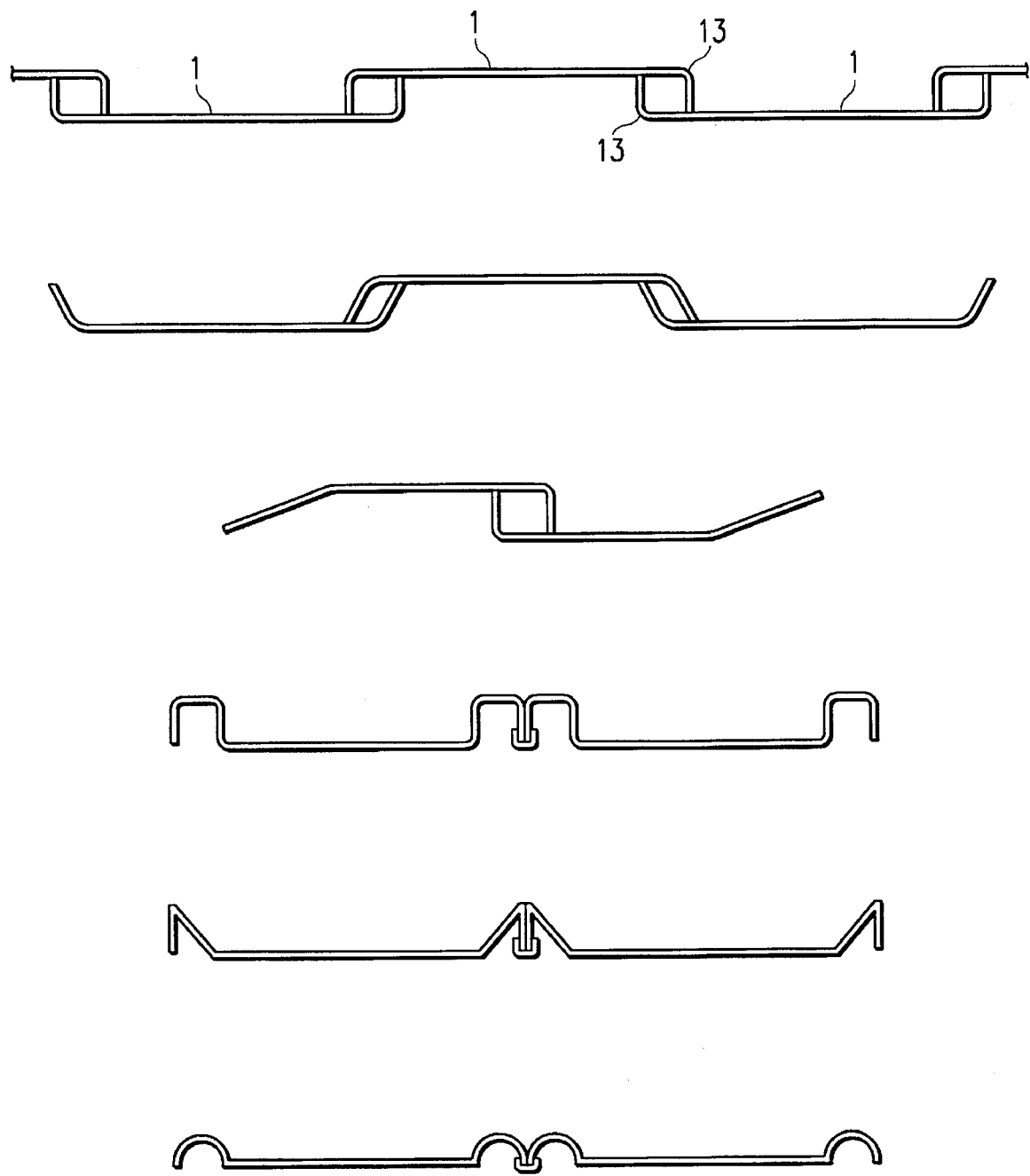
FIG. 6 shows a number of different folded panel sections assembled into different free-standing panel systems.

FIG. 6 shows a number of folded panel sections which can be interlocked in various ways to provide modular free-standing panel systems. These can be used in a wide variety of applications, including display stands, display shelving and cabinets, domes and modules, shop fittings, interior architecture, signage boards, theater props and displays, interior facades, screens and cladding, door systems, stacking and divider systems, partitioning, design furniture and the like. The panels can also be used to manufacture temporary structures such as demountable buildings, disaster shelters, and the like. In this context, it will be appreciated that the ability of the panels to be transported in the flat planar configuration, and subsequently bent and assembled on site, adds considerably to the versatility and adaptability of the invention. Another preferred application is for interior fit-outs in boats, yachts, launches, ships and aircraft where the characteristics of strength, light weight and increased formability can be used to particular advantage.

As foreshadowed in the preamble, composite panels in the past have been designed to provide maximum rigidity and stiffness in bending for minimum weight characteristics. Most known panels, for this reason, tend to behave elastically under load until either the core, the skins or both fail entirely and the panel simply breaks. There is very little if any plastic yielding involved so that the majority of known composite panels have not in the past been able to be bent to any significant extent at room temperature without catastrophic failure. In contrast, as discussed above the present invention is able, under the correct loading conditions, to be neatly folded through angles of at least 90° without failure. By eliminating the need for cutting and joining the panel sections wherever a bend or fold is required in this way, the invention represents a commercially significant improvement over the prior art.

Although the invention has been described with reference to specific examples, it will be appreciated by those skilled in the art that the invention may be embodied in many other forms. In particular, it should be appreciated that the panel need not comprise an inner core sandwiched between a pair of outer skins, but can also simply comprise an inner or core layer bonded to a single outer layer or skin. It should also be emphasized that whilst PVC is a particularly preferred material, any other suitable material with the desired physical properties may also be used.

We claim:

1. A foldable composite panel comprising an inner layer comprising a first material bonded to at least one adjacent outer layer comprising a second material, wherein the first material has a greater plasticity in compression than the second material, such that the composite panel can be permanently folded without failure at ambient temperature through an angle substantially greater than that through which the outer layer alone could be folded without failure under comparable conditions.

2. The foldable composite panel of claim 1, wherein the respective plasticities of the first material and the second material permit permanent cold bending of the panel through an angle of at least ninety degrees without failure.

3. The foldable composite panel of claim 1, wherein the first material is composed of a foam while the second material comprises a skin that is denser than the first material.

4. The foldable composite panel of claim 3, wherein the first material is a polyvinylchloride sealed cell foam and wherein the second material comprises a denser polyvinylchloride skin.

5. The foldable composite panel of claim 4, wherein the first material and second material are bonded together with a suitable PVC compatible semi-elastomeric adhesive.

6. The foldable composite panel of claim 1, wherein the first material has a density of between approximately 15 and 250 kg/m³.

7. The foldable composite panel of claim 1, wherein the first material has a density of between approximately 50 and 100 kg/m³.

8. The foldable composite panel of claim 1, wherein the first material has a density of approximately 70 kg/m³.

9. The foldable composite panel of claim 1, wherein the second material has a density of between approximately 400 and 1400 kg/m³.

10. The foldable composite panel of claim 1, wherein the second material has a density of between approximately 700 and 1400 kg/m³.

11. The foldable composite panel of claim 1, wherein the second material has a density of approximately 800 kg/m³.

12. The foldable composite panel of claim 1, wherein the inner layer is between approximately 4 and 30 mm thick.

13. The foldable composite panel of claim 1, wherein the inner layer is between approximately 8 and 15 mm thick.

14. The foldable composite panel of claim 1, wherein the inner layer is approximately 10 mm thick.

15. The foldable composite panel of claim 1, wherein the outer layer is between approximately 0.5 and 3.0 mm thick.

16. The foldable composite panel of claim 1, wherein the outer layer is approximately 1.0 mm thick.

17. The foldable composite panel of claim 1, comprising a pair of said outer layers bonded to opposite sides of said inner layer to form a composite sandwich panel wherein said inner layer forms a core and said outer layers form skins.

18. The foldable composite panel of claim 1, wherein the overall panel thickness is between approximately 5 and 50 mm thick.

19. The foldable composite panel of claim 1, wherein the overall panel thickness is between 10 and 15 mm thick.

20. The foldable composite panel of claim 1, wherein the overall panel thickness is approximately 12 min.

21. The foldable composite panel of claim 1, wherein the said inner layer is bonded on opposite sides by a pair of said outer layers wherein said inner layer forms a core and said outer layers form skins.

22. The foldable composite panel of claim 21, wherein the overall panel thickness is between approximately 5 and 50 mm thick.

23. The foldable composite panel of claim 21, wherein the overall panel thickness is between 10 and 15 mm thick.

24. The foldable composite panel of claim 21, wherein the overall panel thickness is approximately 12 mm.

25. The foldable composite panel of claim 21, wherein the first material forming the said core has a lower plasticity in tension than the outer layer such that the composite panel can be permanently folded without failure at ambient temperature through an angle substantially greater than that through which the inner layer alone could be folded without failure under comparative conditions.

26. The foldable composite panel of claim 1, wherein upon folding the outer layer naturally forms a relatively uniform rounded edge without failure.

27. The foldable composite panel of claim 26, wherein upon folding, excess material of the outer layer on the inside radius buckles progressively and linearly into the inner layer to form a relatively straight substantially uniform fold line defining the inside edge of the bend.

28. The foldable composite panel of claim 27, where in the progressive inward buckling of the inside skin is accommodated by the core yielding plasticly in compression.

29. The foldable composite panel of claim 1, wherein the overall density of the panel is between approximately 100 and 400 kg/m³.

30. The foldable composite panel of claim 1, wherein the overall density of the panel is between approximately 200 to 350 kg/m³.

31. The foldable composite panel of claim 1, wherein the shear strength of the panel is between 3 and 10 N/mm.

32. The foldable composite panel of claim 1, wherein the shear strength is between approximately 6 and 7 N/mm.

33. The foldable composite panel of claim 1, wherein said folding can be initiated by a forming tool adapted to form a linear notch in one of said at least one outer layer to initiate buckling of the outer layer and/or localized crushing of the inner layer to form a line of weakness at the desired fold line.

34. A method of folding a composite panel comprising the steps of forming a line of weakness along one of the outer layers, applying a bending moment to the composite panel thereby causing the panel to fold along the line of weakness, and forcing the excess material of the inside skin to buckle progressively uniformly into the core material to form a relatively straight fold line defining the inside edge of the fold.

35. The method of folding of claim 34, wherein said line of weakness can be formed through a forming tool adapted to form a linear notch in at least one outer layer to initiate buckling of the outer layer.

36. The method of folding of claim 34, comprising the further step of applying an adhesive in the vicinity of the fold to secure the panel in the folded configuration.

37. A method of folding a composite panel comprising the steps of forming a substantially planar composite panel, machining a substantially straight generally V-shaped groove into the panel, applying an adhesive in or around said groove, and folding the panel to substantially close said V-shaped groove whereby upon curing, the adhesive retains the panel in the folded configuration.

* * * * *